United States Patent
Fuchs et al.

(10) Patent No.: US 10,308,510 B2
(45) Date of Patent: Jun. 4, 2019

(54) BURNER BASKET FOR AN AMMONIA OXIDATION BURNER

(71) Applicants: ThyssenKrupp Industrial Solutions AG, Essen (DE); ThyssenKrupp AG, Essen (DE)

(72) Inventors: Jürgen Fuchs, Dortmund (DE); Klaus Ruthardt, Dortmund (DE)

(73) Assignees: THYSSENKRUPP INDUSTRIAL SOLUTIONS AG, Essen (DE); THYSSENKRUPP AG, Essen (DE)

( * ) Notice: Subject to any disclaimer, the term of this patent is extended or adjusted under 35 U.S.C. 154(b) by 7 days.

(21) Appl. No.: 15/528,710

(22) PCT Filed: Nov. 10, 2015

(86) PCT No.: PCT/EP2015/076249
§ 371 (c)(1),
(2) Date: May 22, 2017

(87) PCT Pub. No.: WO2016/078975
PCT Pub. Date: May 26, 2016

(65) Prior Publication Data
US 2017/0260051 A1    Sep. 14, 2017

(30) Foreign Application Priority Data
Nov. 21, 2014 (DE) ................. 10 2014 223 813

(51) Int. Cl.
*B01J 8/00* (2006.01)
*B01J 8/02* (2006.01)
(Continued)

(52) U.S. Cl.
CPC ............ *C01B 21/28* (2013.01); *C01B 21/267* (2013.01)

(58) Field of Classification Search
CPC ....... B01J 8/00; B01J 8/02; B01J 19/00; B01J 19/24; C01B 21/00; C01B 21/20;
(Continued)

(56) References Cited

U.S. PATENT DOCUMENTS

| | | | |
|---|---|---|---|
| 2,226,149 A | 12/1940 | Zimmermann | |
| 9,242,216 B2 * | 1/2016 | Fuchs | ............... C01B 21/28 |
| 2004/0234433 A1 | 11/2004 | Axon | |

FOREIGN PATENT DOCUMENTS

| | | |
|---|---|---|
| DE | 102011112781 A | 3/2013 |
| DE | 102011112782 A | 3/2013 |

(Continued)

OTHER PUBLICATIONS

English translation of International Search Report issued in PCT/EP2015/076249, dated Feb. 4, 2016 (dated Feb. 12, 2016).

(Continued)

*Primary Examiner* — Natasha E Young
(74) *Attorney, Agent, or Firm* — thyssenkrupp North America, Inc.

(57) ABSTRACT

A burner basket for an ammonia oxidation burner includes a gas-permeable bottom plate, with a side wall that is spaced apart from the bottom plate by a gap, and a retaining device covering the bottom plate and the gap for retaining particles of a bulk material that can be arranged in the burner basket. A fastening element is arranged on the bottom plate, by which the retaining device is fixed in place. An ammonia oxidation burner comprises a burner for oxidizing ammonia and a burner basket.

10 Claims, 3 Drawing Sheets

(51) Int. Cl.
*B01J 19/00* (2006.01)
*B01J 19/24* (2006.01)
*C01B 21/26* (2006.01)
*C01B 21/28* (2006.01)

(58) Field of Classification Search
CPC ....... C01B 21/24; C01B 21/26; C01B 21/267; C01B 21/28
See application file for complete search history.

(56) References Cited

FOREIGN PATENT DOCUMENTS

| WO | 9108982 A | 6/1991 |
|---|---|---|
| WO | 2013034303 A | 3/2013 |

OTHER PUBLICATIONS

English abstract of DE102011112782A.
English abstract of DE102011112781A.

\* cited by examiner

BURNER BASKET FOR AN AMMONIA OXIDATION BURNER

CROSS REFERENCE TO RELATED APPLICATIONS

This application is a U.S. National Stage Entry of International Patent Application Serial Number PCT/EP2015/076249, filed Nov. 10, 2015, which claims priority to German Patent Application No. DE 102014223813.7 filed Nov. 21, 2014, the entire contents of both of which are incorporated herein by reference.

FIELD

The present disclosure generally relates to a burner basket for an ammonia oxidation burner.

BACKGROUND

Ammonia oxidation burners are used in the synthesis of nitric acid. In the ammonia oxidation burner, ammonia ($NH_3$) and oxygen ($O_2$) are catalytically converted to nitric oxide (NO) and water ($H_2O$). The NO obtained is then further used to produce nitric acid.

Platinum-rhodium gauzes, which are placed on a bulk material composed of particles, are ordinary used as catalysts in ammonia oxidation burners. The particles are as a rule composed of a filling material of stoneware, glass, porcelain or stainless steel and are placed in a burner basket arranged inside the burner. The burner basket ordinarily has a gas-permeable bottom plate provided with openings, so that $NH_3$ fed into the burner can flow through the burner basket and the bulk material.

The oxidation of ammonia in the burner requires an operating temperature of approx. 890° C. at a pressure of approx. 10 bar. Because of the high temperature, the burner basket expands during operation of the ammonia oxidation burner. In order to reduce mechanical stresses in the material of the burner basket, the bottom plate and the side wall are often configured as separate components that are arranged in the interior of the ammonia oxidation burner independently of each other. A gas thus forms between the bottom plate and the side wall.

A burner basket of this type, with a bottom plate and a side wall separated from each other by a gap, is described in WO 2013034303 A1. In order to prevent particles of the bulk material from falling out of the basket through the openings in the gas-permeable bottom plate or through the gap between the bottom plate and the side wall, this burner basket is provided with a retaining device in the form of a gas-permeable gauze that covers the gap and the bottom plate. In this burner basket, however, there is a risk that the gauze, as a result of the movements of the bottom plate with respect to the side wall, can detach from the bottom plate and expose the gap or the openings of the bottom plate so that filling material can fall out of the burner basket.

DETAILED DESCRIPTION

Figure 1:
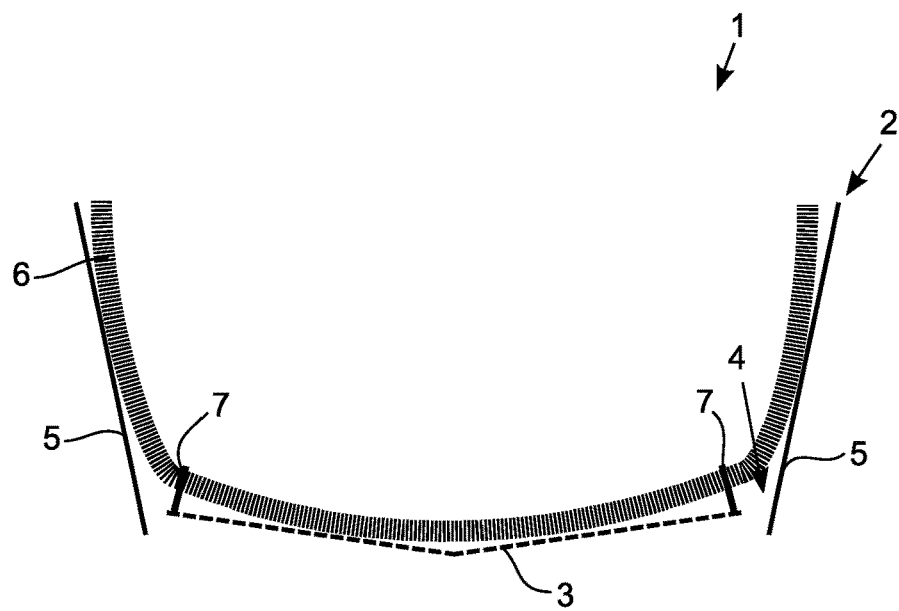
FIG. 1 is a side cross section view of an embodiment of a burner basket of the present disclosure.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

An object of the present invention is to prevent losses of the particles of the bulk material located in the burner basket.

The object is achieved by means of a burner basket for an ammonia oxidation burner comprising a gas-permeable bottom plate, a side wall that is spaced apart from the bottom plate by a gap, and a retaining device covering the bottom plate and the gap for retaining particles of a bulk material that can be arranged in the burner basket, wherein one or more fastening elements are arranged on the bottom plate by means of which the retaining device is fixed in place.

The object is further achieved by an ammonia oxidation burner comprising such a burner basket.

By means of the fastening element or the fastening elements, the retaining device is fixed in place on the bottom plate, so that the retaining device can move together with the bottom plate with respect to the side wall. Detachment of the retaining device from the bottom plate because of movements of the bottom plate with respect to the side wall can be prevented. Even during movements of the bottom plate with respect to the side wall, the gas-permeable bottom plate and the gap between the bottom plate and the side wall therefore remain covered by the retaining device, so that losses of the particles present in the burner basket can be prevented.

The retaining device is preferably configured as a gas-permeable fabric, in particular as a gas-permeable gauze. Particularly preferably, the retaining device has meshes whose mesh size is smaller than the size of the particles of the bulk material, so that the particles of the bulk material can be retained by the retaining device, while the gas, however, can flow through the retaining device.

In an advantageous configuration of the invention, it is provided that the fastening elements are arranged in an edge area of the bottom plate facing the gap, making it possible to reduce the probability of at least partial exposure of the gap due to slipping of the retaining device.

It has been found to be advantageous if the fastening element or the fastening elements have at least one pin that is arranged transversely to the bottom plate, in particular perpendicularly to the bottom plate. The retaining device can be hooked onto the pin. In the case of a retaining device configured as a gauze, said device can be attached to the pin so that the pin fixes the retaining device in place. Alternatively or additionally, the fastening element can have a barb. The barb can hook into the retaining device and thus cause the retaining device to be attached to the bottom plate so that it can only be detached with difficulty.

Preferred is a configuration in which the bottom plate is connected to a sealing device that at least partially covers the gap. The sealing device thus reduces the gap to a residual gap size, so that particles larger than this residual gap size cannot fall out of the burner basket. Particularly preferably, the sealing device covers the gap in such a way that the gap is reduced to a maximum size of 10 mm. The sealing device can be rigidly connected to the bottom plate. It is possible for the sealing device to be composed of an elastic material so that the sealing device can undergo deformation on contact with the side wall. Moreover, the sealing device can be moveably connected to the bottom plate so that the position of the sealing device can be adapted to the size of the gap between the bottom plate and the side wall.

A structural configuration provides that the sealing device is rigidly connected to the retaining device so that the retaining device is fixed in place with respect to the sealing device. Alternatively, the sealing device can be moveably connected to the retaining device, or the devices can be arranged in the burner basket independently of each other.

It is advantageous if the sealing device has a rectangular or a trapezoidal cross-section. Because of the rectangular or trapezoidal cross-section, the sealing can be flat against a side wall oriented transversely, and in particular perpendicularly, to the bottom plate or may form a gap of a uniform size with respect to such a side wall.

The bottom plate of the burner basket is preferably configured as a honeycomb grid, gauze bottom, sieve bottom, grated bottom or perforated plate so that the gas fed into the ammonia oxidation burner can flow through the bottom plate.

In a structural configuration, it can be provided that the bottom plate has a U-shaped, V-shaped, or trapezoidal cross-section.

In the various figures, the same parts are always indicated with the same reference numbers and are therefore as a rule named or mentioned only once each.

FIG. 1 shows a burner basket 2 that is arranged in an ammonia oxidation burner in order to catalytically convert ammonia and oxygen to nitric oxide and water. The burner basket 2 has an essentially spherical form, and on operation of the ammonia oxidation burner 1, it is arranged in the interior thereof so that ammonia and oxygen can flow through it. The burner basket 2 is composed of a gas-permeable bottom plate 3 and a surrounding side wall 5. The bottom plate 3 has openings and for example can be configured as a honeycomb grid, gauze bottom, sieve bottom, grated bottom, or perforated plate. According to this example, the bottom plate 3 has a V-shaped cross-section. The gas-permeable bottom plate 3 and the side wall 5 are fixed in place in the ammonia oxidation burner 1 independently of each other and are not directly connected to each other. There is therefore a gap 4 between the gas-permeable bottom plate 3 and the side wall 5. Above the bottom plate 3, a retaining device 6 configured as a gas-permeable gauze is arranged in the burner basket 2, said retaining device allowing ammonia and oxygen to pass through. The retaining device 6 prevents particles from falling through the gap 4 and the openings of the bottom plate 3. The gauze has meshes whose mesh width is smaller than the size of the particles to be brought into the burner basket 2.

Figure 2:
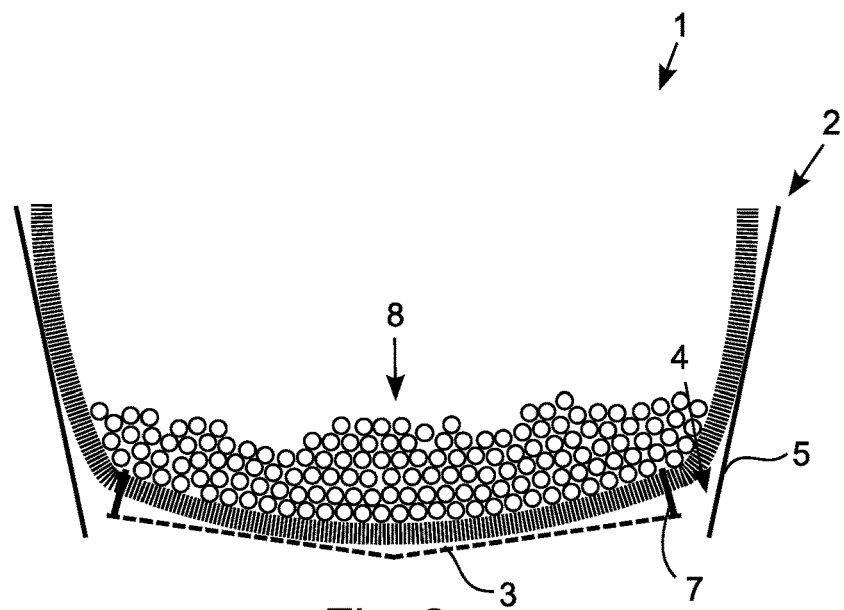
FIG. 2 is a side cross section view of the burner basket of FIG. 1 partially filled with particles of a bulk material as disclosed herein.

A burner basket 2 corresponding to that shown in FIG. 1 that is filled with a bulk material composed of particles is shown in FIG. 2. Inside the burner basket 1 is a bulk material 8 of particles configured as filling material. The filling material is shown in simplified fashion as essentially spherical particles, but deviating from the diagram shown in FIG. 2, they can also be configured as particles of any desired predetermined shape, such a Raschig rings, Pall rings, Berl, Interlox, or Torus saddles, and/or Interpack bodies. The filling material is preferably composed of stoneware, porcelain, glass, or stainless steel. A catalyst gauze not shown in the figures, for example a platinum/rhodium catalyst gauze, can be arranged above the bulk material 8. Optionally, the particles can comprise a catalyst material so that the catalytic action is improved.

As can further be seen from the diagram in FIGS. 1 and 2, a plurality of fastening elements 7 is arranged on the bottom plate 3 by means of which the retaining device 6 is fixed in place. The fastening elements 7 prevent the retaining device 6 from detaching from the bottom plate 3 because of said bottom plate 3. The gas-permeable bottom plate 3 and the gap 4 therefore remain covered by the retaining device 6 even during movements of the bottom plate 3 with respect to the side wall 5, so that losses of the filling material 8 present in the burner basket 2 can be prevented.

The fastening elements 7 are arranged in an edge area of the bottom plate 3 that faces the gap. Each of the fastening elements 7 has a pin on which the gauze is placed. The pins of the fastening elements 7 are oriented transversely to the bottom plate 3 so that movement of the gauze parallel to the surface of the bottom plate 3 is blocked.

Figure 3:
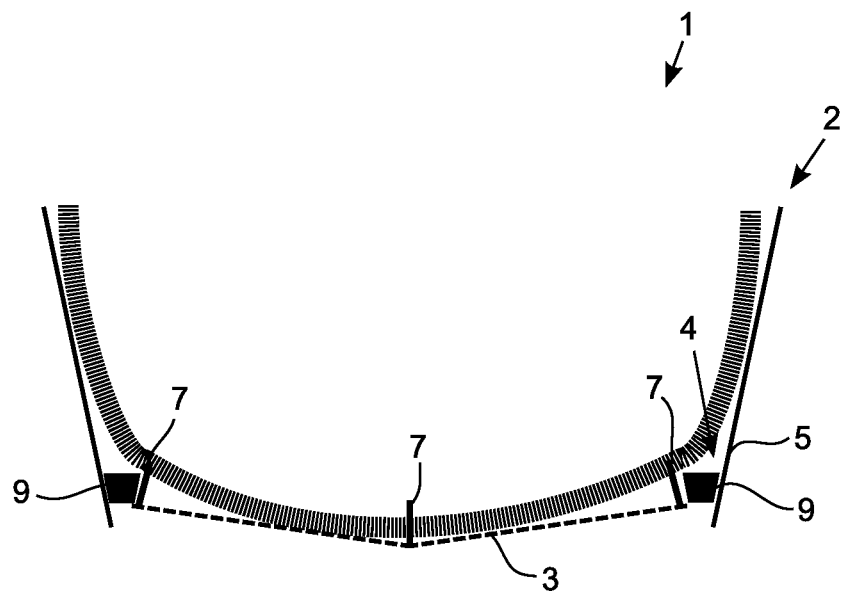
FIG. 3 is a side cross section view of an alternate embodiment of a burner basket of the present disclosure.

FIG. 3 shows a second example of a burner basket 2 according to the invention. Compared to the first example, the burner basket 2 according to FIG. 3 has an additional fastening element 7 that is arranged in the central area of the bottom plate 3. In addition, the burner basket 2 of the second example is provided with a sealing device 9 that at least partially covers the gap 4 between the bottom plate 3 and the side wall 2 and thus seals it off with respect to the particles of the bulk material 8. The sealing device 9 is rigidly connected to the bottom plate 3 and composed of an elastic material, so that the sealing device 9 can undergo deformation if it comes to rest against the side wall 2. The sealing device 9 runs around the arc-shaped edge of the bottom plate 3 and has a trapezoidal cross-section.

Figure 4:
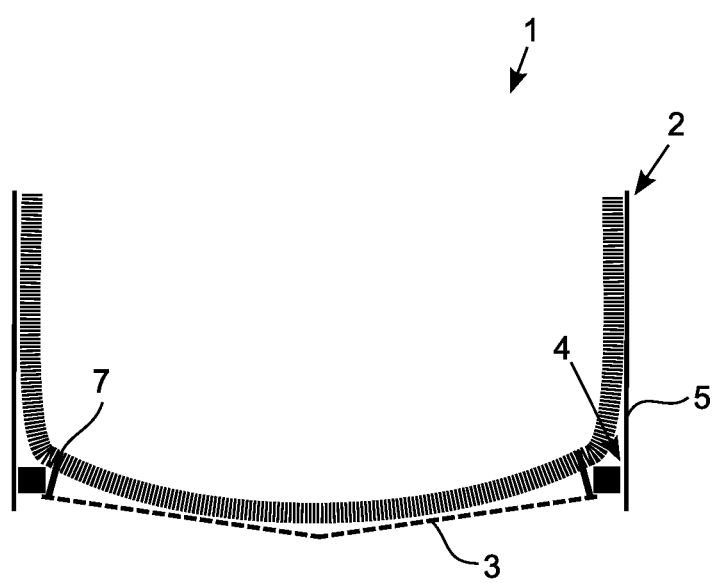
FIG. 4 is a side cross section view of still another alternate embodiment of a burner basket of the present disclosure.

FIG. 4 shows a third example of a burner basket 2 according to of the invention. The burner basket 2 has a side wall 2 that is oriented essentially perpendicularly to the bottom plate 3. The shape of the burner basket 2 is therefore essentially cylindrical. A sealing device 9 is provided on the bottom plate 3 in the edge area adjacent to the gap, which has a square cross-section.

Figure 5:
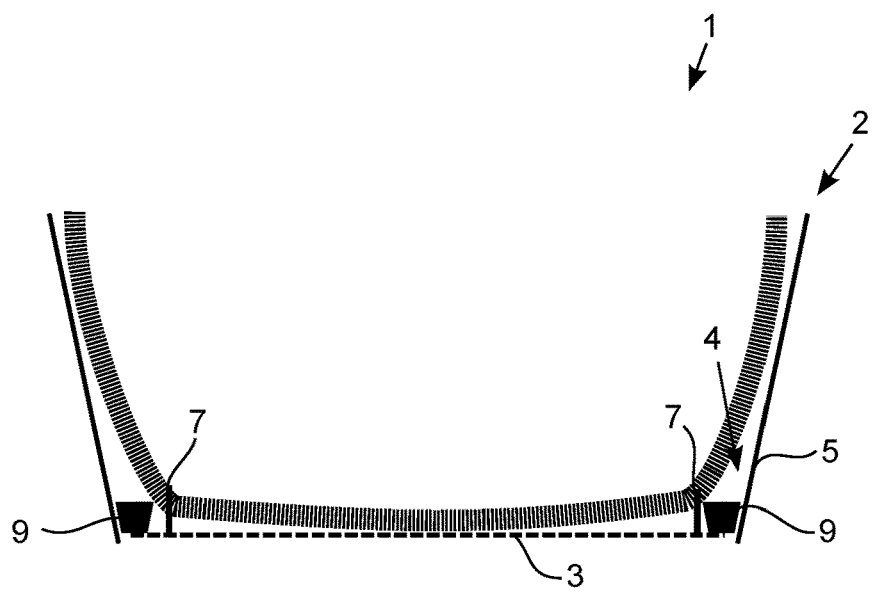
FIG. 5 is a side cross section view of yet another alternate embodiment of a burner basket of the present disclosure.

FIG. 5 shows a burner basket 2 according to a fourth example, in which a bottom plate 3 is provided that is configured as a flat bottom plate 3. A plurality of fastening elements 7 is arranged on the bottom plate 3 in the edge area of said bottom plate 3, by means of which a retaining device 6 configured as a gas-permeable fabric is fixed in place. The circumferential side wall 5 of the burner basket 2 has an essentially conical shape. The side wall 5 is therefore arranged obliquely to the bottom plate 3. The side wall 5 encloses an angle with respect to the bottom plate 3 that is greater than 90°. The burner basket 2 further has a sealing device 9 that at least partially covers the gap 4 between the bottom plate 3 and the side wall 2 so that a certain degree of sealing with respect to the bulk material particles can be made possible. The sealing device 9 is rigidly connected to the bottom plate 3 and composed of an elastic material so that the sealing device 9 can be deformed if it lies against the side wall 2. The sealing device 9 runs around the arc-shaped edge of the bottom plate 3 and has a trapezoidal cross-section.

Figure 6:
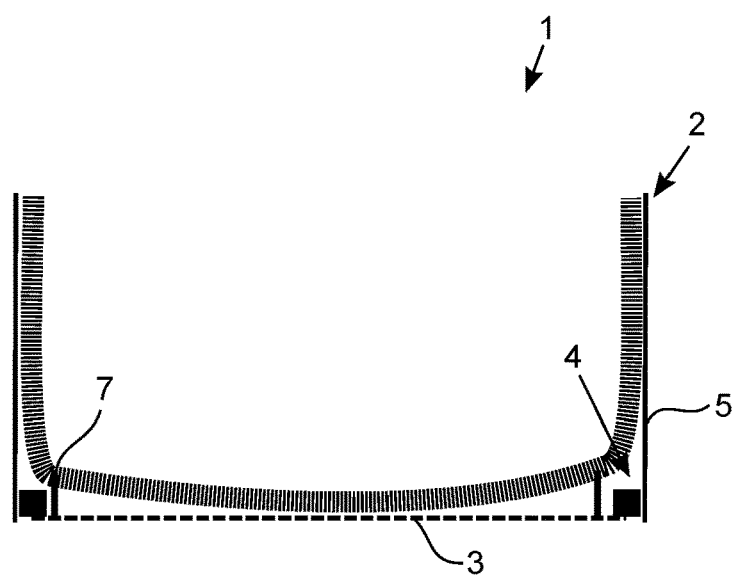
FIG. 6 is a side cross section view of another alternate embodiment of a burner basket of the present disclosure.

FIG. 6 shows a fifth example of a burner basket according to the invention 2 that differs from the fourth example in that the burner basket 2 has a side wall 2 that is oriented essentially perpendicularly to the bottom plate 3. The shape of the burner basket 2 is therefore essentially cylindrical. A sealing device 9 that has a square cross-section is arranged on the bottom plate 3 in the edge area adjacent to the gap.

Each of the burner baskets 2 of an ammonia oxidation burner 1 presented has one gas-permeable bottom plate 3 and one side wall 5 spaced apart from the bottom plate 3 by a gap 4. Furthermore, in these burner baskets 2, a retaining device 6 covering the bottom plate 3 and the gap 4 is provided for retaining particles of a bulk material 8 arranged in the burner basket 2, said retaining device being fixed in place by means of a fastening element 7 arranged on the bottom plate 3. By fixing the retaining device 6 in place, losses of the particles of the bulk material 8 present in the burner basket 2 can be prevented.

LIST OF REFERENCE NUMBERS

1 Ammonia oxidation burner
2 Burner basket
3 Bottom plate
4 Gap
5 Side wall
6 Retaining device
7 Fastening element
8 Bulk material
9 Sealing device

What is claimed is:
1. A burner basket for an ammonia oxidation burner comprising:
a gas permeable bottom plate;
a sidewall adjacent to, and spaced apart from, said bottom plate so as to define a gap between said bottom plate and said sidewall;
a retaining device covering both of said bottom plate and the gap between said bottom plate and said sidewall, said retaining device configured to retain particles of bulk material that may be disposed on said retaining device;
at least one fastening element coupled to said bottom plate and configured to couple said retaining device to said bottom plate; and
a sealing device connected to said bottom plate and at least partially covering the gap between said bottom plate and said sidewall.

2. The burner basket of claim 1, wherein said retaining device is gas-permeable fabric.

3. The burner basket of claim 1, wherein said retaining device comprises meshes having a mesh width smaller than a size of the particles of bulk material that may be disposed in said retaining device.

4. The burner basket of claim 1, wherein said at least one fastening element is disposed in an edge area of said bottom plate facing the gap.

5. The burner basket of claim 1, wherein said at least one fastening element comprised at least one pin that is arranged transverse to said bottom plate.

6. The burner basket of claim 1, wherein said at least one fastening element comprised at least one pin that is perpendicular to said bottom plate.

7. The burner basket of claim 1, wherein said sealing device is rigidly coupled to aid retaining device.

8. The burner basket of claim 1, wherein said sealing device has one of a rectangular or trapezoidal cross-section.

9. The burner basket of claim 1, wherein said bottom plate is one of a honeycomb grid, gauze bottom, sieve bottom, grated bottom, or perforated plate.

10. The burner basket of claim 1, wherein said bottom plate has one of a U-shaped cross-section, a V-shaped cross-section, or a trapezoidal cross-section.

* * * * *